(12) United States Patent
Marc

(10) Patent No.: US 8,961,889 B2
(45) Date of Patent: Feb. 24, 2015

(54) DEVULCANIZATION OF RUBBER AND OTHER ELASTOMERS

(71) Applicant: Michel Marc, Lenexa, KS (US)

(72) Inventor: Michel Marc, Lenexa, KS (US)

(73) Assignee: Novation IQ LLC, Lenexa, KS (US)

( * ) Notice: Subject to any disclaimer, the term of this patent is extended or adjusted under 35 U.S.C. 154(b) by 0 days.

(21) Appl. No.: 13/898,971

(22) Filed: May 21, 2013

(65) Prior Publication Data

US 2013/0259762 A1 Oct. 3, 2013

Related U.S. Application Data

(62) Division of application No. 13/185,167, filed on Jul. 18, 2011, now Pat. No. 8,470,897.

(51) Int. Cl.
*B01J 19/08* (2006.01)
*C08J 11/10* (2006.01)

(52) U.S. Cl.
CPC .............. *C08J 11/10* (2013.01); *C08J 2321/00* (2013.01); *C10G 2300/1003* (2013.01)
USPC ................... 422/186.04; 422/186.26; 521/40; 521/41; 425/28.1; 425/40; 425/41; 264/405

(58) Field of Classification Search
CPC ................. C08J 11/10; C08J 2321/00; C10G 2300/1003; B01J 9/088
USPC ......... 521/40, 405, 41, 43, 45.5, 46, 47, 40.5; 423/449.7; 264/405, 417, 418, 421, 264/422, 425, 499; 425/28.1, 40, 41; 422/186.04; 528/480, 502 R, 503
See application file for complete search history.

(56) References Cited

U.S. PATENT DOCUMENTS

| | | | | |
|---|---|---|---|---|
| 3,186,142 A | * | 6/1965 | Borgardt et al. | 53/329.4 |
| 4,104,205 A | | 8/1978 | Novotny et al. | |
| 4,423,191 A | * | 12/1983 | Haven et al. | 525/169 |
| 5,589,260 A | * | 12/1996 | Ben Zvi et al. | 428/327 |
| 2006/0033234 A1 | * | 2/2006 | Yoo et al. | 264/237 |

* cited by examiner

*Primary Examiner* — Frances Tischler
(74) *Attorney, Agent, or Firm* — Stinson Leonard Street LLP

(57) ABSTRACT

A devulcanization apparatus for devulcanizing a plurality of cross-linked elastomer particles. The apparatus includes a first conveyor functioning as a high voltage electrode and a second conveyor functioning as a ground electrode. A generator is operable to apply an alternating electric field between the first and second conveyors. A devulcanization region is provided between the first and second conveyors in which the cross-linked elastomer particles are placed.

10 Claims, 8 Drawing Sheets

DEVULCANIZATION OF RUBBER AND OTHER ELASTOMERS

CROSS-REFERENCE TO RELATED APPLICATIONS

This application claims priority to and is a divisional of U.S. patent application Ser. No. 13/185,167, filed on Jul. 18, 2011, now U.S. Pat. No. 8,470,897, which is incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

The present invention relates to the recycling of vulcanized elastomers, such as vulcanized rubber found in tires, involving the use of an alternating electric field to devulcanize the elastomers.

2. Description of Related Art

Millions of used tires, hoses, belts, and other vulcanized rubber products are discarded annually after they have been worn-out during their limited service life. These used vulcanized rubber products are typically hauled to a dump because there is very little use for them after they have served their original intended purpose. A limited number of used tires are utilized in building retaining walls, as guards for protecting boats and similar things where resistance to weathering is desirable. Efforts to reclaim scrap vulcanized rubber have primarily included a physical shearing process which is suitable for a rubber which can be mixed with asphalt, forming asphalt rubber. However, a far greater number of tires, hoses, and belts are simply discarded.

During the vulcanization process of rubber, accelerators, promoters, and/or initiators, are used to form large numbers of sulfur crosslinks. After vulcanization, the crosslinked rubber becomes thermoset and cannot be reformed into other products. Thus, vulcanized rubber products generally cannot be simply melted and recycled into new products. The sulfur crosslinks which are present in used vulcanized rubber, such as tire rubber, are deleterious in a subsequent curing process which uses vulcanized rubber as a component in a new polymer mixture. Formulations of tire rubber which use more than minor amounts of vulcanized rubber result in a brittle cured end product unsuitable for many uses such as automobile or truck tires.

In light of the foregoing, various techniques for devulcanizing rubber have been developed. For example, in one devulcanization process, vulcanized rubber is placed in an organic solvent to recover various polymerized fractions as taught in Butcher, Jr. et al., U.S. Pat. No. 5,438,078. Platz, U.S. Pat. No. 5,264,640 teaches taking scrap rubber from used tires and regenerating the monomeric chemicals which are subsequently recovered. This method uses gaseous ozone to break down the crosslinked structure of the rubber followed by thermal depolymerization in a reaction chamber. Platz et al., U.S. Pat. No. 5,369,215 teaches a similar process in which used tire material may be depolymerized under elevated temperatures and at a reduced pressure to recover the monomeric compounds. Myers et al., U.S. Pat. No. 5,602,186 discloses a process for devulcanizing rubber by desulfurization, comprising the steps of contacting vulcanized crumb rubber with a solvent and an alkali metal to form a reaction mixture, heating the reaction mixture in the absence of oxygen and with mixing to a temperature sufficient to cause the alkali metal to react with sulfur in the crumb rubber, and maintaining the temperature below that at which thermal cracking of the rubber occurs, thereby devulcanizing the crumb rubber. Hunt et al., U.S. Pat. No. 5,891,926 is directed to a devulcanization process for rubber in which elevated temperatures and pressures are used to partially devulcanize the rubber. Thereafter, a solvent 2-butanol is used to extract the devulcanized rubber from the non-rubber and/or solids component.

Novotny et al., U.S. Pat. No. 4,104,205 discloses a technique for devulcanizing sulfur-vulcanized elastomer containing polar groups which comprises applying a controlled dose of microwave energy of between 915 and 2450 MHz and between 41 and 177 watt-hours per pound in an amount sufficient to sever substantially all carbon-sulfur and sulfur-sulfur bonds and insufficient to sever significant amounts of carbon-carbon bonds. Other patents directed to microwave techniques include Lai et al. U.S. Pat. No. 4,440,488; Hayashi et al., U.S. Pat. No. 4,469,817; Ficker, U.S. Pat. No. 4,665,101; and Wicks et al., U.S. Pat. No. 6,420,457. In general, the application of microwave energy results in uneven heating of the elastomer. As such, the degree to which the elastomer particles are devulcanized vary within the rubber particle, which is typically most evidenced by different surface and interior properties.

Isayev et al., U.S. Pat. No. 5,284,625 discloses a continuous ultrasonic method for breaking the carbon-sulfur, sulfur-sulfur and, if desired, the carbon-carbon bonds in a vulcanized elastomer. Through the application of certain levels of ultrasonic energy (15 kHz to 50 kHz) in the presence of pressure and optionally heat, it is reported that vulcanized rubber can be broken down. Using this process, the rubber becomes soft, thereby enabling it to be reprocessed and reshaped in a manner similar to that employed with previously uncured elastomers. Other patents directed to ultrasonic devulcanization techniques include Isayev, U.S. Pat. No. 5,258,414 and Roberson et al., U.S. Pat. No. 6,095,440.

Despite the various devulcanization processes known the art, there remains a need to develop improved devulcanization techniques, especially those that are capable of devulcanizing the rubber particles in a relatively uniform manner.

BRIEF SUMMARY OF THE INVENTION

The present invention is directed to a process for devulcanizing crosslinked elastomer particles. The process comprises (1) providing a composition comprising vulcanized crosslinked elastomer particles in a devulcanization apparatus, and (2) applying an alternating electric field to the composition comprising the vulcanized crosslinked elastomer particles (with optional fresh unvulcanized elastomer, e.g., fresh unvulcanized rubber), the alternating electric field having a frequency and voltage sufficient to devulcanize the crosslinked elastomer particles. In one aspect, the frequency of the alternating electric field is in the radiofrequency range, for example about 1 to 100 MHz, and the voltage of the alternating electric field is about 1000 to 10,000 V. In another aspect, the crosslinked elastomer particles comprise a polar vulcanized rubber material. In still another aspect, the crosslinked elastomer particles have a particle size of 6 to 400 mesh. In still another aspect, the fresh unvulcanized elastomer or fresh unvulcanized rubber comprises at least 10 wt % of the composition.

In one aspect, the composition is placed in a cavity which resides between a first electrode (e.g., top electrode) and a second electrode (e.g., bottom electrode). The alternating electric field is generated between the first and second electrodes. The process may be operated in batch mode or the composition may be continuously fed between the first top electrode and the second bottom electrode. In another aspect, the top electrode is a high voltage electrode having a voltage between 1000 and 10,000 V.

In yet another aspect, the alternating electric field is generated between a plurality of top transverse electrode rods and a plurality of bottom transverse electrode rods. The process may be operated in batch mode or the composition may be continuously fed between the top transverse electrode rods and the bottom transverse electrode rods. Exemplary conveying devices include a conveyor and roller assembly.

In another aspect, the present invention is directed to a process for devulcanizing elastomer particles (such as vulcanized rubber) comprising the steps of (1) providing a composition comprising vulcanized crosslinked elastomer particles in a devulcanization apparatus, (2) applying an alternating electric field to the composition comprising the vulcanized crosslinked elastomer particles (with optional fresh unvulcanized elastomer, e.g., fresh unvulcanized rubber), the alternating electric field having a frequency and voltage sufficient to devulcanize the crosslinked elastomer particles, and (3) continuously feeding the composition between a first conveyor and a second conveyor, wherein the alternating electric field is generated between the first conveyor and the second conveyor, the first conveyor functioning as a high voltage electrode and the second conveyor functioning as a ground electrode. In another aspect, the first conveyor comprises a main conveying plate having a plurality of plate sections comprised of electrically conductive material which are interconnected together. The plate sections are preferably sized and shaped to permit the main conveying plate to be conveyed in a loop while maintaining the cross-linked elastomer particles under pressure during the devulcanization process. In an exemplary aspect, one or more of the plate sections comprise a main body section having a plurality of protrusions and recesses such that the protrusions of a first plate section engage corresponding recesses in an adjacent second plate section and wherein a shaft extends through the first and the second plate sections to secure the first and second plate sections together. The plate sections have one or more holes for engaging teeth of a driver for driving the first conveyor. In the exemplary aspect, a shaft extends through a plurality of ball bearings, the ball bearings being retained in a groove formed in a conveyor frame as the first conveyor moves.

In another aspect, the conveyors are operable to compress the vulcanized elastomer particles (e.g., vulcanized rubber) during the devulcanization process. In one aspect, the composition is compressed to about 50 to 5000 psi. During the process, the alternating electric field causes movement of polar molecules in the vulcanized elastomer particles, whereby friction resulting from the molecular movement translates into heat throughout the composition.

In still another aspect, a substantially constant voltage is provided between the first and second electrodes (e.g., between the first and second conveyors). In yet another aspect, the generator is operable to generate a signal that is substantially a sinusoid having a wavelength $\lambda$, and wherein the composition is positioned between the first and second electrodes and adjacent a point on the first electrode that is located a distance of $1/4\lambda$ or $1/4\lambda$ plus a multiple of $1/2\lambda$ from the generator such that the substantially constant voltage is provided between the first and second electrodes. In a further aspect, a substantially constant current passes between the first and second electrodes and through the composition (e.g., between the first and second conveyors).

In yet another aspect, the present invention is directed to a process for forming a vulcanized elastomer composition. The process comprises (1) applying an alternating electric field to a first composition comprising vulcanized crosslinked elastomer particles such that the alternating electric field has a frequency and voltage sufficient to devulcanize the crosslinked elastomer particles to form a second composition comprising devulcanized elastomer particles, (2) adding a crosslinking agent to the second composition comprising the devulcanized elastomer particles, and (3) vulcanizing the second composition having the crosslinking agent to form the vulcanized elastomer composition. In one aspect, the frequency of the alternating electric field is about 1 to 100 MHz, and the voltage of the alternating electric field is about 1000 to 10,000 V.

The first composition may comprise a vulcanized rubber, such as one having a particle size of 6 to 400 mesh. The first composition may comprise vulcanized rubber particles and optionally fresh unvulcanized rubber. In one aspect, the fresh unvulcanized elastomer (e.g., fresh unvulcanized rubber) comprises at least 10 wt % of the first composition. In still another aspect, the present invention comprises the step of adding fresh unvulcanized elastomer (e.g., fresh unvulcanized rubber) to the second composition prior to the vulcanizing step. In one aspect, the fresh unvulcanized elastomer (e.g., fresh unvulcanized rubber) may comprise at least 10 wt % of the second composition. In still another aspect, the process comprises the step of adding a filler and/or or vulcanization accelerator to the second composition prior to the vulcanizing step. Suitable crosslinking agents include sulfur or a sulfur donor. In yet another aspect, the vulcanizing step comprises heating the second composition comprising the crosslinker and the devulcanized elastomer particles. In another aspect, the vulcanizing step comprises applying an alternating electric field to the second composition comprising the crosslinker and the devulcanized elastomer particles at a voltage and frequency sufficient to vulcanize the devulcanized elastomer particles with the crosslinking agent.

In still another aspect, the present invention is directed to a devulcanization apparatus for devulcanizing a plurality of cross-linked elastomer particles. The apparatus comprises a first electrode comprising a first conveyor and a second electrode comprising a second conveyor. The first conveyor functions as a high voltage electrode and the second conveyor functions as a ground electrode. The apparatus also includes a generator operable to apply an alternating electric field between the electrodes. A devulcanization region is located between the first and second conveyors. The first electrode is a high voltage electrode, preferably having a voltage between 1000 and 10,000 V. The first conveyor preferably comprises a main conveying plate having a plurality of plate sections comprised of electrically conductive material which are interconnected together. The plate sections are sized and shaped to permit the main conveying plate to be conveyed in a loop while maintaining the cross-linked elastomer particles under pressure. In an exemplary aspect, the plate sections comprise a main body section having a plurality of protrusions and recesses such that the protrusions of a first plate section engage corresponding recesses in an adjacent second plate section and wherein a shaft extends through the first and the second plate sections to secure the first and second plate sections together. Also, the plate sections have one or more holes for engaging teeth of a driver for driving the first conveyor. The shaft extends through a plurality of ball bearings, the ball bearings being retained in a groove formed in a conveyor frame as the first conveyor moves. In another aspect, the frame includes an insulator adjacent to the first conveyor. The apparatus is preferably capable of compressing vulcanized elastomer particles in the devulcanization region to about 50 to 5000 psi.

Additional aspects of the invention, together with the advantages appurtenant thereto, will be set forth in part in the description which follows, and in part will become apparent to those skilled in the art upon examination of the following, or may be learned from the practice of the invention. The advantages of the invention may be realized and attained by means of the instrumentalities and combinations particularly pointed out in the appended claims.

DETAILED DESCRIPTION OF EXEMPLARY EMBODIMENTS

The present invention is directed to a process for devulcanizing crosslinked vulcanized elastomers by applying an alternating electric field to the vulcanized elastomer. The alternating electric field may be applied to a wide range of crosslinked vulcanized thermoset elastomers, such as those polymeric networks found in many thermosets. Without being limited to the enumerated examples, these vulcanized elastomers include polyurethanes, epoxy/phenolic resins, epoxy resins, saturated polyester resins, unsaturated polyester resins, phenolic/formaldehyde resins, rubber, and combinations thereof. Once the elastomer has been devulcanized, it can be revulcanized into additional useful end products. The elastomer may be combined with other materials during the devulcanization process. For example, it is contemplated that a whole shoe may be ground, shredded, or otherwise cut into small particles, and then the rubber from the shoe may be devulcanized in accordance with the present invention.

The term "vulcanized" refers to a three-dimensional crosslinked structure between the elastomer (e.g., rubber) molecules. Thus, the term "vulcanized rubber" encompasses rubbers having a three-dimensional crosslinked structure between rubber molecules. The introduction of the crosslinked structure may be performed by various crosslinking methods known to those skilled in the art, such as those involving sulfur vulcanization, thiuram cure, peroxide vulcanization, and the like.

The term "devulcanized" is used to indicate that certain surface and bulk properties of the crosslinked vulcanized elastomer (e.g., vulcanized rubber) have been chemically altered by the application of an alternating electric field in accordance with the present invention. In general, the number of mono, di, and polysulfides which formed polymer crosslinks during the initial vulcanization process are reduced by the alternating electric field devulcanization process. As such, the elastomer (e.g., rubber) is referred to here as "devulcanized" though it is understood that some crosslinking may remain in the end "devulcanized" product.

The term "fresh" or "virgin" or "unvulcanized" is used to indicate that the elastomer (e.g., rubber) has not been vulcanized.

While the invention will be described in detail below with reference to various exemplary embodiments, it should be understood that the invention is not limited to the specific configuration or methodology of these embodiments. In addition, although the exemplary embodiments are described as embodying several different inventive features, one skilled in the art will appreciate that any one of these features could be implemented without the others in accordance with the invention.

Figure 1:
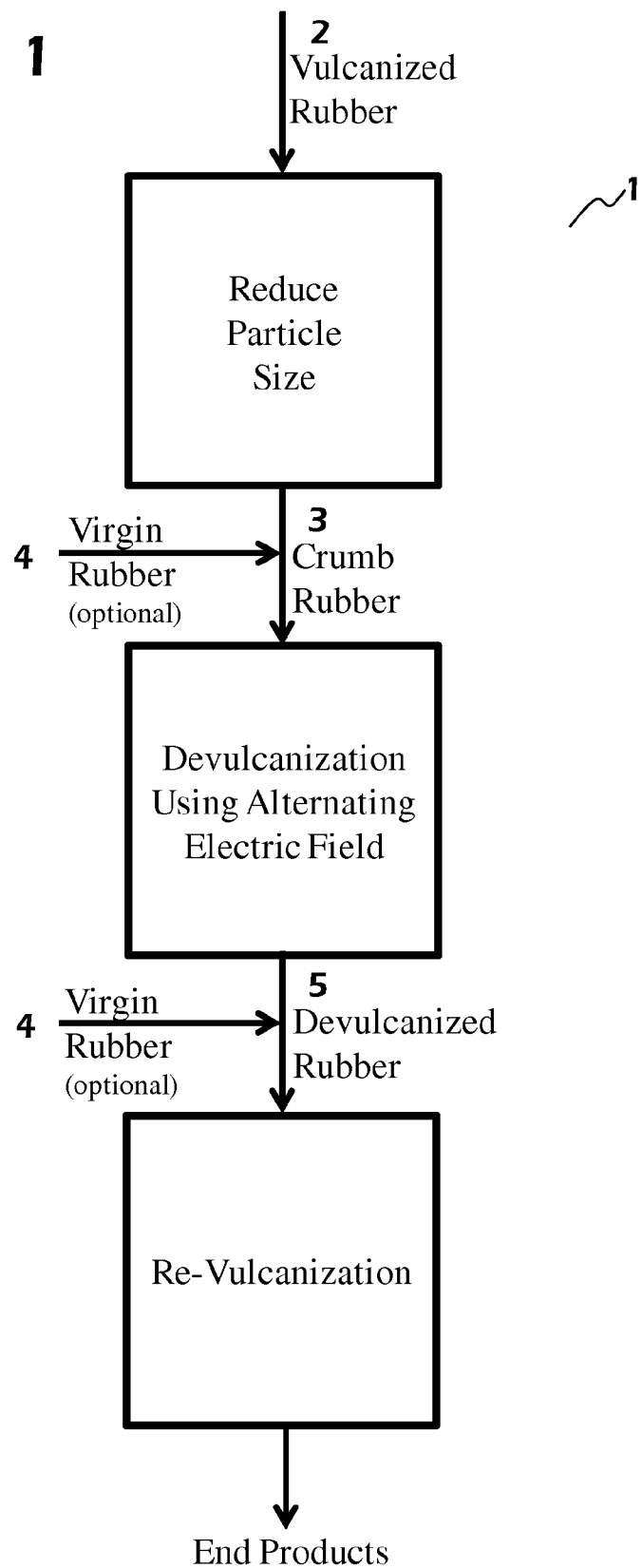
FIG. 1 is a process flow diagram illustrating how vulcanized rubber (or other vulcanized elastomers) may be devulcanized in accordance with the present invention and then subsequently revulcanized into useful end products.

In one exemplary embodiment, the vulcanized elastomer that is to be devulcanized using an alternating electric field in accordance with the present invention is a rubber elastomer. Thus, the present invention is directed to a process for devulcanizing rubber by applying an alternating electric field to the vulcanized rubber. An overview of the process 1 is illustrated in FIG. 1. In general, a vulcanized rubber composition 2, such as that found in tires, is ground or milled to form a "crumb rubber" composition 3 having a reduced particle size. The crumb rubber composition 3 is then optionally combined with fresh or virgin unvulcanized rubber 4 and then devulcanized by applying an alternating electric field in accordance with the present invention. The resulting devulcanized rubber composition 5 may optionally be combined with additional fresh or virgin unvulcanized rubber 4 and then revulcanized to form an end product.

The vulcanized rubber composition 2, or more generally the crosslinked vulcanized elastomer, to be devulcanized by applying an alternating electric field in accordance with the present invention may comprise either polar or non-polar or low-polar rubbers. That is, the vulcanized rubber may be comprised of rubbers having inherent polarity, for example, polychloroprene rubber, nitrile rubber, nitrile rubber-poly(vinyl chloride) blends [for example, 30 percent by weight maximum poly(vinyl chloride), and typically about 20 percent poly(vinyl chloride) by weight], bromobutyl rubber, or chlorobutyl rubber. Nearly all commercial tires are comprised of polar rubbers. Vulcanized non-polar or low-polar rubbers (for example, polyolefin rubbers (e.g., ethylene-propylene rubbers, butadiene rubbers, styrene-butadiene rubbers), fluorocarbon rubbers like Teflon®, and silicone rubbers may be devulcanized in accordance with the present invention if the polarity has been introduced as the result of some other material introduced into the rubber composition (for example, carbon black). Thus, various additives may be added to the rubber composition in order to improve or tune the polarity of the rubber composition as desired. The use of additives is generally described in Marc, U.S. Patent Application No. 2006/0012083. Other examples of specific vulcanized rubbers which may be devulcanized by the alternating electric field process includes polyalkenylenes, synthetic elastomers made from monomer of conjugated dienes having from 4 to 10 carbon atoms or interpolymers of said dienes (1) among themselves, or (2) with monomers of vinyl substituted aromatic hydrocarbons having from 8 to 12 carbon atoms.

The vulcanized rubber may be obtained from a number of commercial suppliers, and may include a homogeneous or heterogeneous mixture of vulcanized rubber from a variety of manufacturers. Preferably, the vulcanized rubber is obtained from used tires. It is readily appreciated by those having ordinary skill in the art that vulcanized rubber originating from used automobile or truck tires will typically encompass products originating from many manufacturers and comprising a wide assortment of chemical constituents and compositions. Accordingly, a wide variety of different chemicals are expected to be present in the vulcanized rubber.

The vulcanized elastomer (e.g., the vulcanized rubber) is preferably in the form of small elastomer particles. The particle size of the vulcanized rubber preferably ranges from 6 to 400 mesh (e.g., 10, 40, 80, 120, 140, 160, 180, 200, 220, 240, 260, 280, 300, 320, 340, 360, 380, 400 mesh, or some range therebetween). The particle size is typically between 10 and 200 mesh, and typically between 30 and 40 mesh. Yet, it is anticipated that smaller particle sizes are most preferred, and that they are typically greater than 100 mesh, and still more preferably greater than 200 mesh. The particle size of the vulcanized rubber may be reduced to the preferred range using any suitable means known in the art. Typically, the vulcanized rubber is mechanically ground, milled sheared, or otherwise pulverized into a type of rubber known as "crumb rubber." Cryogenic processes for forming crumb rubber may also be employed. See e.g., Perfido et al. U.S. Pat. No. 5,588,600; and Edson, U.S. Pat. No. 5,927,627. Further, various commercial suppliers of crumb rubber are known in the art.

Further, as shown in FIG. 1 prior to applying the alternating electric field to the vulcanized rubber or other vulcanized elastomer, the vulcanized rubber or other vulcanized elastomer may be combined with virgin or fresh unvulcanized elastomers, such as virgin or fresh unvulcanized rubber. Such virgin or fresh unvulcanized rubber may also be polar or non-polar, such as natural isoprene rubber, styrene-butadiene rubber, butadiene rubber, nitrile-butadiene rubber etc. Typically, the particles of the vulcanized elastomer (e.g., vulcanized rubber) and the virgin or fresh unvulcanized elastomers (e.g., unvulcanized rubber) are premixed together. The vulcanized rubber may be present in the composition to be devulcanized at any suitable level—for example, about 10, 20 30, 40, 50, 60, 70, 80, 90, or 100 wt % (or some range therebetween). Preferably, the virgin or fresh rubber comprises at least 10 wt % of the overall composition. This is often determined by the use and application of the rubber product and the desired physical properties.

An alternating electric field is then applied to the vulcanized rubber (and optional virgin or fresh unvulcanized rubber) composition in a manner that targets select chemical bonds in the vulcanized rubber. In particular, sulfur-carbon and sulfur-sulfur bonds of the vulcanized rubber are targeted by the alternating electric field. The alternating field causes the molecules to vibrate, which creates internal friction between the rubber molecules. The use of an alternating electric field to devulcanize crosslinked elastomer materials results in a relatively even application of the wave energy throughout the material.

For the devulcanization of vulcanized tire rubber (e.g., crumb rubber), the frequency of the alternating electric field preferably ranges from about 1 to 100 MHz, and more preferably from about 10 to 60 MHz. The most preferred frequencies are the allowed center frequencies for industrial, scientific, and medical ("ISM") applications, namely, 27.12 MHz or 40.68 MHz. The voltage preferably ranges from about 1000 to 10,000 V, more preferably about 3000 to 7000 V, and still more preferably about 4000 to 6000 V. The exposure time to the alternating electric field varies depending upon the voltage applied, the frequency applied, the size of the devulcanization apparatus, and the power factor of the rubber, but typically ranges between a few seconds to up to one minute. For example, application of an alternating electric field at 4000 V and 27.12 MHz for 30 seconds is typically sufficient to devulcanize rubber particles comprised of ground tire rubber. If the voltage is raised to 8000 V but the frequency is maintained at 27.12 MHz, the exposure time is decreased, for example to about 7.5 seconds.

Examples are provided below of devulcanization apparatuses for generating an alternating electric field between two electrodes wherein the voltage between the electrodes is substantially constant, which is necessary to obtain a substantially constant current between the electrodes and across the vulcanized rubber composition. As used herein, the term "substantially constant voltage" between electrodes, i.e., a high voltage electrode and a ground electrode, means that the difference between the voltage provided at a point on the high voltage electrode compared to the voltage provided at each other point on the high voltage electrode is preferably less than ±10%, more preferably less than ±8%, more preferably less than ±6%, more preferably less than ±4%, and most preferably less than ±2%.

Figure 2:
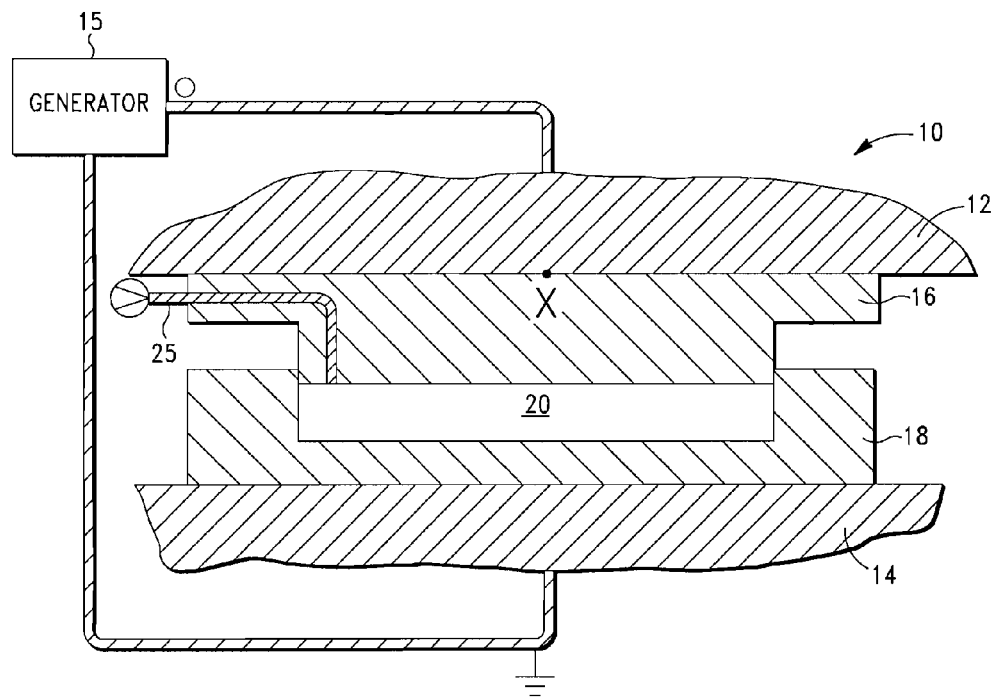
FIG. 2 is a devulcanization apparatus which employs an alternating electric field in accordance with a first embodiment of the present invention.

FIG. 2 illustrates an exemplary devulcanizing apparatus 10 in accordance with a first embodiment of the present invention. In general, the vulcanized rubber is placed between two electrodes such that the rubber effectively becomes the dielectric of a capacitor. An alternating electric field generated between the electrodes causes polar molecules in the rubber to be attracted and repelled by the rapidly changing polarity of the alternating electric field. The friction resulting from this molecular movement causes a degradation of the crosslinking of the rubber.

More specifically, devulcanizing apparatus 10 includes a top electrode 12 and a bottom electrode 14, both of which are connected to an electromagnetic energy source or generator 15 operable to generate an alternating electric field between the electrodes. For example, the top electrode 12 may be the high voltage electrode while the bottom electrode 14 is the ground electrode (or vice versa). The voltage between the electrodes is adjustable and varies between different applications. Typically, the voltage between the electrodes is in the range of 1000 to 10,000 V, preferably in the range of 3000 to 7000 V, and more preferably in the range of 4000 to 6000 V. The alternating electric field is generated at frequencies ranging from about 1 to 100 MHz, and is preferably generated at frequencies ranging from about 25 to 40 MHz. Most preferably, the alternating electric field is generated at either 27.12 MHz or 40.68 MHz (both of which are allowed center frequencies for industrial, scientific, and medical (ISM) applications). Also included within apparatus 10 are a top mold 16 and a bottom mold 18 that together define a devulcanization cavity therebetween. In the illustrated example, a vulcanized rubber composition 20 (with optional fresh or virgin unvulcanized rubber) is placed within the cavity. The top mold 16 and the bottom mold 18 are compressed so as to remove as much air as possible from the cavity. An optional vacuum line 25 may be formed in one or both of the top mold 16 or bottom mold 18 in order to further remove air from the cavity. In operation, an alternating electric field is applied across the rubber composition 20, causing the molecules of the rubber to vibrate and cause devulcanization of the rubber. The temperature of the rubber composition typically increases to about 95 to 175° C., preferably to about 120 to 130° C., during the devulcanization process.

Generator 15 contains a power tube and LC circuit, or may alternatively contain solid-state technology. Preferably, generator 15 is tuned to resonate at the selected frequency, which occurs when the inductive reactance balances the capacitive reactance at the selected frequency, as follows:

$$f = \frac{1}{2\pi\sqrt{LC}} \quad (1)$$

where
f=frequency of alternating electric field in hertz
L=inductance in henries
C=capacitance in farads.

Figure 3:
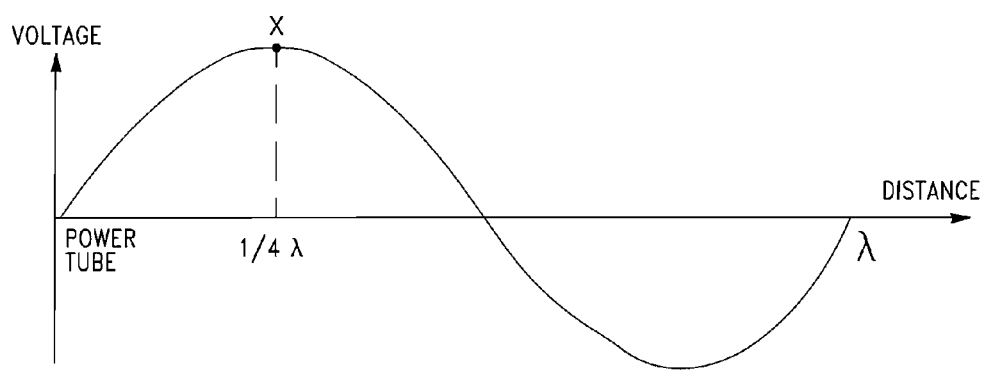
FIG. 3 shows the signal generated by the apparatus of FIG. 2, wherein the signal is substantially a sinusoid having a wavelength λ and wherein a single point (designated as point X) is located at the ¼ wavelength position.

As shown in FIG. 3, the signal generated by the apparatus of FIG. 2 is substantially a sinusoid having a wavelength λ. Preferably, the vulcanized rubber particles are placed between top electrode 12 and bottom electrode 14 and generally centered at a position that is ¼λ or, alternatively, ¼λ plus a multiple of ½λ, (e.g., ¾λ, 1¼λ, etc.), from the power tube of generator 15. It can be seen that the peak of the sinusoid is located at these positions, which provides the most constant voltage (i.e., the lowest voltage change) on the sinusoid. One skilled in the art will understand that the application of similar voltages across the entire area of the vulcanized rubber particles will result in substantially even heating of the vulcanized rubber particles.

The wavelength of the sinusoid is expressed as follows:

$$\lambda = \frac{c}{f} \quad (2)$$

where
λ=wavelength of sinusoid in meters
c=speed of light ($3\times10^8$ m/sec)
f=frequency of alternating electric field in hertz.

Using this equation, the wavelength of a sinusoid for an alternating electric field generated at 27.12 MHz is as follows:

$$\lambda = \frac{3\times10^8}{27.12\times10^6} = 11.1 \text{ meters} = 36.3 \text{ feet} \quad (3)$$

Thus, the ¼λ, position is located 9.1 feet from the power tube of generator 15.

Similarly, the wavelength of a sinusoid for an alternating electric field generated at 40.68 MHz is as follows:

$$\lambda = \frac{3\times10^8}{40.68\times10^6} = 7.5 \text{ meters} = 24.6 \text{ feet} \quad (4)$$

Thus, the ¼λ, position is located 6.15 feet from the power tube of generator 15.

One skilled in the art will understand that the use of a lower frequency (e.g., 27.12 MHz) will provide more consistent voltages between electrodes 12 and 14 due to the longer wavelength λ, of the generated signal. However, the use of a higher frequency (e.g., 40.68 MHz) will heat the vulcanized rubber particles at a faster rate. Thus, for any given application, the desired frequency may be selected with these considerations in mind. Of course, the surface area of the cavity containing the vulcanized rubber particles may dictate the desired frequency. For example, if the surface area of the cavity is relatively small, it is possible to use a higher frequency (e.g., 40.68 MHz). However, if the surface area of the cavity is relatively larger, it may be preferable to use a lower frequency (e.g., 27.12 MHz).

As discussed above, apparatus 10 shown in FIG. 2 may be used to apply substantially constant voltages between electrodes 12 and 14 if the cavity containing the vulcanized rubber particles is placed at or near the ¼λ, position (or, alternatively, ¼λ, plus a multiple of ½λ). With this electrode configuration, a single point (designated as point X in FIGS. 2 and 3) is located at the ¼ wavelength position (or, alternatively, ¼λ, plus a multiple of ½λ), which corresponds to the highest voltage on the sinusoid. In order to apply even more consistent voltages between the electrodes, top electrode 12 may be replaced with a top electrode in which a plurality of points are located at the ¼ wavelength position (or, alternatively, ¼λ plus a multiple of ½λ), as will be described below.

Figure 4:
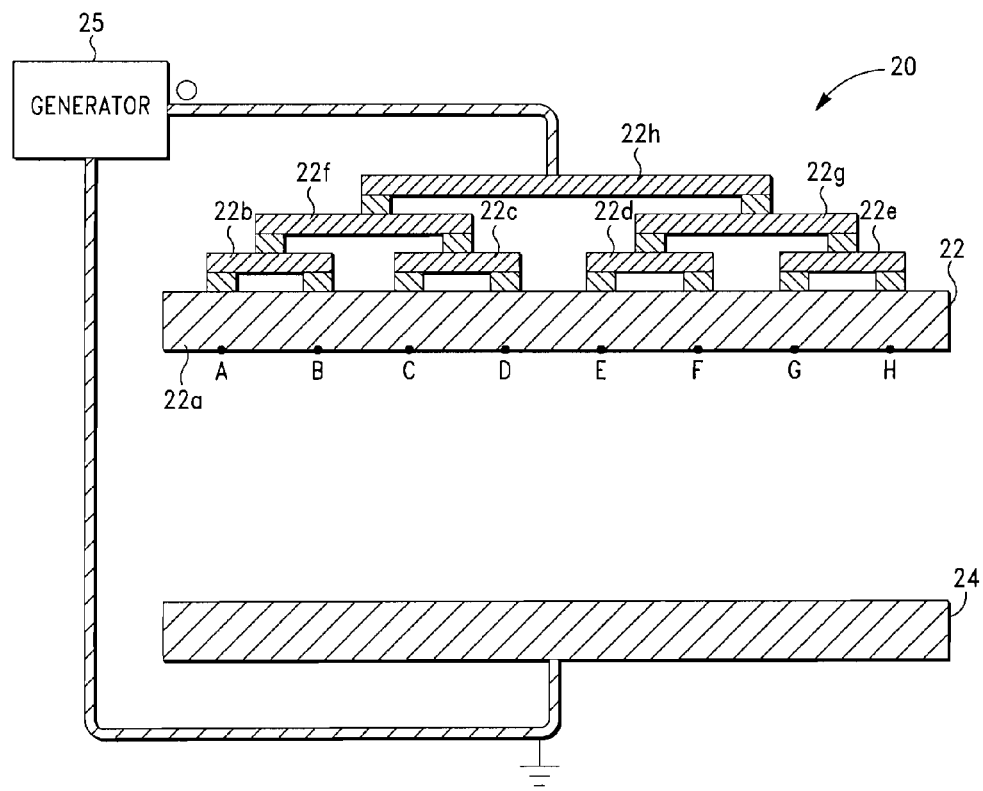
FIG. 4 illustrates an alternative electrode configuration for the devulcanization apparatus of FIG. 2, wherein the voltage between a top electrode comprising a plurality of tiered plates and a single-plate bottom electrode is substantially constant. The electrode configuration is shown without the other components of the devulcanization apparatus.

Referring to FIG. 4, a diagram of an exemplary electrode configuration that may be used in place of the electrode configuration shown in FIG. 2 to generate an alternating electric field between two electrodes is designated as reference numeral 20. Apparatus 20 includes a top electrode 22 and a bottom electrode 24, both of which are connected to an energy source or generator 25 operable to generate an alternating electric field between the electrodes. It should be understood that the only difference between the electrode configuration of apparatus 10 as shown in FIG. 2 and the electrode configuration 20 shown in FIG. 4 is the configuration of the top electrode. In FIG. 2, top electrode 12 comprises a single plate. However, in FIG. 4, it can be seen that top electrode 22 comprises a plurality of electrically connected plates arranged in a tiered configuration. Specifically, top electrode 22 includes a main plate 22a located adjacent the cavity containing the vulcanized rubber particles, which is electrically connected to plates 22b, 22c, 22d, and 22e. Then, plates 22b and 22c are electrically connected to plate 22f, and plates 22d and 22e are electrically connected to plate 22g. Further, plates 22f and 22g are electrically connected to plate 22h, which is electrically connected to the power tube of the generator (or other solid-state supply). As can be seen, in the illustrated embodiment, the main plate 22a of top electrode 22 and bottom electrode 24 are positioned proximate to the cavity containing the vulcanized rubber particles and are sized to extend across the cavity containing the vulcanized rubber particles. Of course, the size of the electrodes will vary depending on the surface area of the cavity containing the vulcanized rubber particles.

As shown in FIG. 4, points A, B, C, D, E, F, G, and H are evenly spaced along the length of main plate 22a, and the power tube of the generator is designated as point O. The size and positioning of the various plates are chosen such that the distances OA, OB, OC, OD, OE, OF, OG, and OH are the same and, thus, points A, B, C, D, E, F, G, and H are each located at the ¼ wavelength position (or, alternatively, ¼λ, plus a multiple of ½λ). For example, if the selected frequency is 27.12 MHz or 40.68 MHz, each of points A, B, C, D, E, F, G, and H would be located 9.1 feet or 6.15 feet, respectively, from point O. By contrast, as shown in FIG. 2, only point X is located at the ¼ wavelength position.

Figure 5:
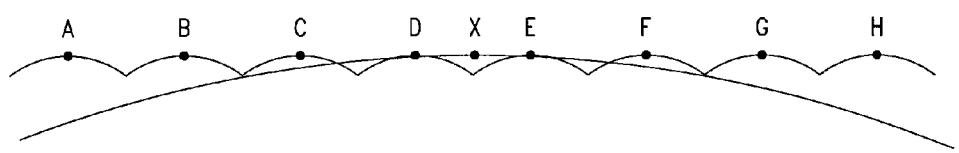
FIG. 5 shows the peak of the signal generated using the electrode configuration shown in FIG. 4, wherein eight points (designated as points A-H) are located at the ¼ wavelength position, and wherein the peak of the sinusoid of FIG. 3 is superimposed thereon in order to illustrate the differences between the configurations of the top electrodes of FIGS. 2 and 4.

FIG. 5 shows the peak of the signal generated by the electrode configuration of FIG. 4, wherein points A, B, C, D, E, F, G, and H are located at the ¼ wavelength position (or, alternatively, ¼λ plus a multiple of ½λ). The peak of the sinusoid of FIG. 3, along with point X, is superimposed thereon in order to illustrate the differences between the configurations of top electrode 12 (FIG. 2) and top electrode 22 (FIG. 4). As can be seen, point X and points A, B, C, D, E, F, G, and H are each located at the peak of the sinusoid, which corresponds to the highest voltage. In effect, the configuration of top electrode 22 substantially flattens-out the peak of the sinusoid. As such, top electrode 22 may be used to apply more consistent voltages between electrodes 22 and 24 as compared to top electrode 12.

Of course, one skilled in the art will understand that top electrode 22 is merely an example of an electrode that may be used to provide more consistent voltages between the electrodes. Other configurations may also be used in which multiple points (i.e., more or fewer points than the eight points shown in FIG. 4) are located at the ¼ wavelength position (or, alternatively, ¼λ plus a multiple of ½λ). For example, FIG. 8E illustrates an electrode configuration in which four points are located at the ¼ wavelength position (or, alternatively, ¼λ, plus a multiple of ½λ), as described below. Stated another way, the top electrode may comprise any configuration of electrically connected plates that are sized and positioned such that each of a plurality of points are located the same distance from the power tube of the generator.

Figure 6:
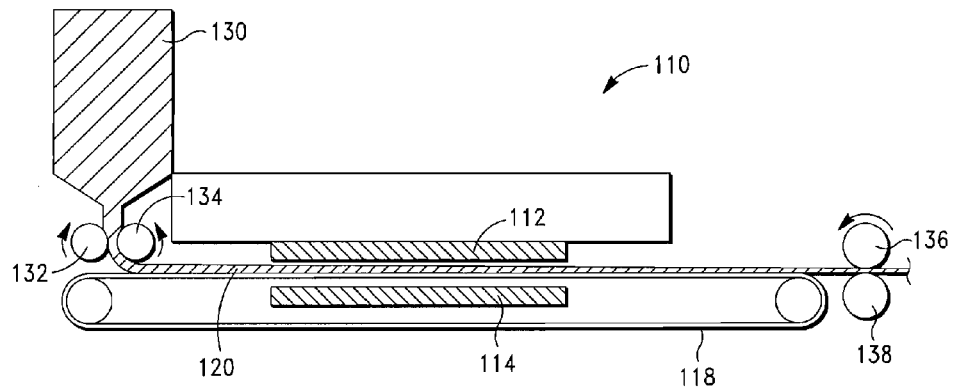
FIG. 6 is a devulcanization apparatus which employs an alternating electric field in accordance with a second embodiment of the present invention.

FIG. 6 illustrates an exemplary devulcanizing apparatus 110 in accordance with a second embodiment of the present invention. The devulcanizing apparatus 110 includes a top electrode 112 and a bottom electrode 114, both of which are connected to an electromagnetic energy source or generator (not shown) operable to generate an alternating electric field between the electrodes. For example, top electrode 112 may be the high voltage electrode while bottom electrode 114 is the ground electrode (or vice versa). The top electrode 112 may comprise a single plate (e.g., as generally depicted and described in connection with FIG. 2) or may comprise a plurality of electrically connected plates (e.g., as generally depicted and described in connection with FIG. 4).

Also included within apparatus 110 is a conveyor 118 which is positioned against bottom electrode 114 for continuously supplying a composition comprising vulcanized rubber particles 120 (e.g., crumb rubber optionally mixed with fresh or virgin unvulcanized rubber) into the region between the electrodes. The composition comprising the vulcanized rubber particles 120 is preferably metered through hopper 130 to one or more set of rollers 132, 134 to form a generally continuous sheet of vulcanized rubber particles (and optional fresh or virgin unvulcanized rubber). The rollers generally compress the vulcanized rubber particles, which assists with removal of air from the rubber. In the illustrated example, vulcanized rubber (along with the optional virgin or fresh unvulcanized rubber) is metered through the rollers 132, 134 onto the conveyor 118 so as to remove as much air as possible from the rubber composition 120. In operation, an alternating electric field is applied across the rubber composition 120, causing the molecules of the rubber to vibrate and cause devulcanization of the rubber. One or more rollers, presses, or other compacting devices 136, 138 may be used to compress the sheet material during or after the devulcanization process, preferably while the devulcanized rubber is hot. The temperature of the rubber composition typically increases to about 95 to 175° C., preferably about 120 to 130° C., during the devulcanization process.

Figure 7:
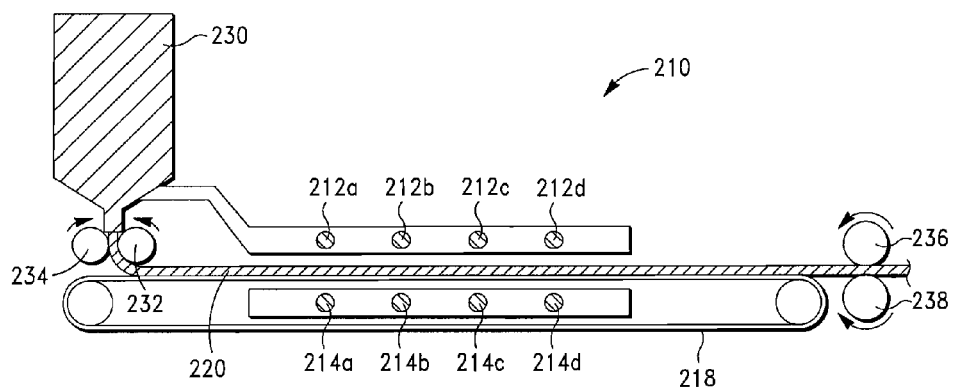
FIG. 7 is a devulcanization apparatus which employs an alternating electric field in accordance with a third embodiment of the present invention.

FIG. 7 illustrates an exemplary devulcanizing apparatus 210 in accordance with a third embodiment of the present invention. The devulcanizing apparatus 210 includes a plurality of top transverse electrode rods 212a-d and a plurality of bottom transverse electrode rods 214a-d. For example, the top transverse electrode rods may function as the high voltage electrodes while the bottom transverse electrode rods function as the ground electrodes (or vice versa). The top transverse electrode rods 212a-d and the bottom transverse electrode rods 214a-d are connected to an electromagnetic energy source or generator (not shown) operable to generate an alternating electric field between the electrode rods. Typically, the voltage between the top transverse electrode rods 212a-d and the bottom transverse electrode rods 214a-d is in the range of 1000 to 10,000 V, preferably in the range of 3000 to 7000 V, and more preferably in the range of 4000 to 6000 V. The alternating electric field is generated at frequencies ranging from about 1 to 100 MHz, is preferably generated at frequencies ranging from about 25 to 40 MHz, and is more preferably generated at either 27.12 MHz or 40.68 MHz.

Also included within apparatus 210 is a conveyor 218 which is positioned over the bottom transverse electrode rods 214a-d for continuously supplying a composition comprising vulcanized rubber particles 220 (e.g., crumb rubber optionally mixed with virgin or fresh unvulcanized rubber) into the region between the top and bottom transverse electrode rods. The vulcanized rubber particles 220 are preferably metered through hopper 230 to one or more set of rollers 232, 234 to form a generally continuous sheet of vulcanized rubber particles. The rollers generally compress the composition comprising vulcanized rubber particles 220, which assists with removal of air from the rubber. In the illustrated example, vulcanized rubber (along with the optional virgin or fresh unvulcanized rubber) is metered onto the conveyor 210 and through the rollers 232, 234 so as to remove as much air as possible from the rubber composition. In operation, an alternating electric field is applied across rubber particles 220, causing the molecules of the rubber to vibrate and cause devulcanization of the rubber. One or more rollers, presses, or other compacting devices 236, 238 may be used to compress the sheet material during or after the devulcanization process, preferably while the devulcanized rubber is hot. The temperature of the rubber composition typically increases to about 95 to 175° C., preferably about 120 to 130° C., during the devulcanization process.

FIGS. 8A to 8E illustrate a devulcanizing apparatus 310 in accordance with a fourth embodiment of the present invention. Like the prior embodiments, the devulcanization apparatus provides for heating of the vulcanized crosslinked elastomer particles via the application of an alternating electric field. The apparatus 310 includes a first conveyor 318A and a second conveyor 318B, each having a conveying belt 315A, 315B which is driven by corresponding drivers 319A, 319B. The conveyors 318A, 318B are designed for continuously supplying a composition comprising vulcanized rubber particles 320 (e.g., crumb rubber optionally mixed with virgin or fresh unvulcanized rubber) into the alternating electric field. The vulcanized rubber particles 320 are preferably metered through an extruder or hopper 330 to the first and second conveyors 318A, 318B to form a generally continuous sheet of vulcanized rubber particles. The conveyors generally compress the composition comprising vulcanized rubber particles 320, which assists with removal of air from the rubber. The pressure applied to the composition is typically between about 50 to 5000 psi, for example about 50, 100, 200, 300, 400, 500, 600, 700, 800, 900, 1000, 1500, 2000, 2500, 3000, 3500, 4000, 4500 or about 5000 psi or some range therebetween. The conveying belt 315A, 315B in each conveyor 318A, 318B preferably comprises a material with a low dielectric constant and a low dissipation factor so that the belt undergoes limited heating during the devulcanization process, and is preferably comprised of silicone rubber.

In the first conveyor 318A, the main conveying plate 322a comprises a plurality of plate sections 380 (e.g., 380a, 380b, 380c, 380d, etc.) which are interconnected together. The plate sections are comprised of electrically conductive material, preferably a metal. The plate sections are sized and shaped in order to permit the main conveying plate 322a to be conveyed in a loop while maintaining the vulcanized rubber particles 320 under pressure during substantially all of the devulcanization process. Exemplary plate sections are illustrated in FIGS. 8B, 8C, and 8E. Each plate section 380 comprises a main body section 382 and a plurality of protrusions 384 and recesses 386. As generally shown in the figures, the protrusions 384 of the first plate section engage corresponding recesses 386 in an adjacent second plate section, and so on. A shaft 389 extending through a plurality of ball bearings 390 and openings 385 in the protrusions 384 is used to secure the adjacent plate sections 380 together. As shown in FIG. 8C, the plate sections 380 (e.g., 380a, 380b, 380c, 380d, etc.) of the main conveying plate 322a preferably each have one or more holes 388 for engaging the teeth of the driver. The second conveyor 318B is constructed in a like manner.

As shown in FIGS. 8A, 8C, 8D, and 8F, the ball bearings 390 are retained in a groove 350 formed in a conveyor frame 362. The path of the conveyors 318A, 318B corresponds to the path taken as the ball bearings move along the looped groove 350 formed in the frame 362 (see FIG. 8A in particular). The frame includes an insulator 365 adjacent to the conveyor 318A which forms the high voltage electrode (see FIG. 8D in particular) which is surrounded by an exterior frame (ground shield) 369. The frame also includes two side pressure pieces 368 that are adjacent to the vulcanized rubber 320 (or other elastomer). The two side pressure pieces 368 are fixed within the frame, and together the pressure pieces 368 and the conveyors 318A, 318B maintain the vulcanized rubber under pressure during the devulcanization process as the rubber moves along the conveyors. The pressure pieces also control the width of the material as it moves along the conveyor through the apparatus. It will be appreciated that the pressure pieces 368 may be separate elements or may be part of the insulator 365 such that the pressure pieces and insulator 365 are a unitary material. The remainder of the frame may be comprised of any suitable material, and is preferably an electrically conductive material, such as a metal. In such a case, the exterior frame also functions as a ground 369. It will be appreciated that for clarity purposes, the frame 362 is not illustrated in FIG. 8A; however, the location of the groove 350 holding the ball bearings 390 is included in dashed lines in FIG. 8A in order to show the path of the conveyor as it move along the groove in the frame.

In the illustrated example, vulcanized rubber 320 (along with the optional virgin or fresh unvulcanized rubber) is metered through devulcanization apparatus 310 and through the conveyors 318A, 318B so as to remove as much air as possible from the rubber composition. In operation, an alternating electric field is applied across rubber 320, causing the molecules of the rubber to vibrate and cause devulcanization of the rubber. The conveyors compress the rubber composition as it moves along the conveyors. The temperature of the rubber composition typically increases to about 95 to 175° C., preferably about 120 to 130° C., during the devulcanization process. The rubber composition exits the devulcanization apparatus in a state that is largely devulcanized. The conveyor is preferably variable speed, fixed length, and fixed power. For example, an exemplary conveyor may be operated at a power of about 120 KW and speed of about 6 to 8 ft/min. The devulcanization region is preferably about 18 to 36 inches wide, about 0.25 to 0.5 inches thick and about 6 to 12 feet wide. The throughput is approximately 30 to 40 pounds of particles (e.g., rubber) per minute.

Figure 8A:
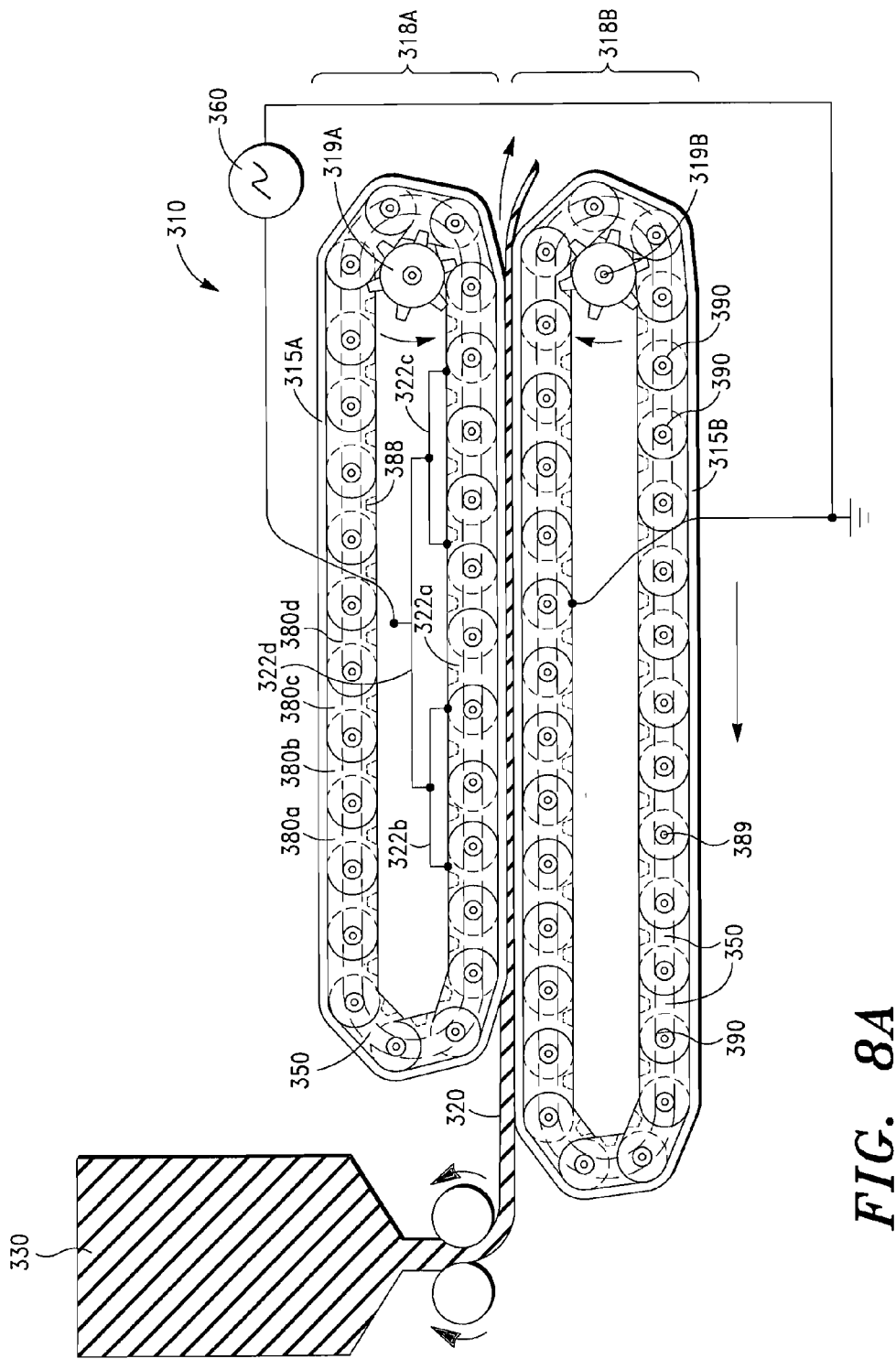
FIG. 8A is a devulcanization apparatus which employs an alternating electric field in accordance with a fourth embodiment of the present invention. For clarity, the frame is not shown, although the groove in the frame is shown in dashed lines to illustrate the path of conveyance.
Figure 8B:
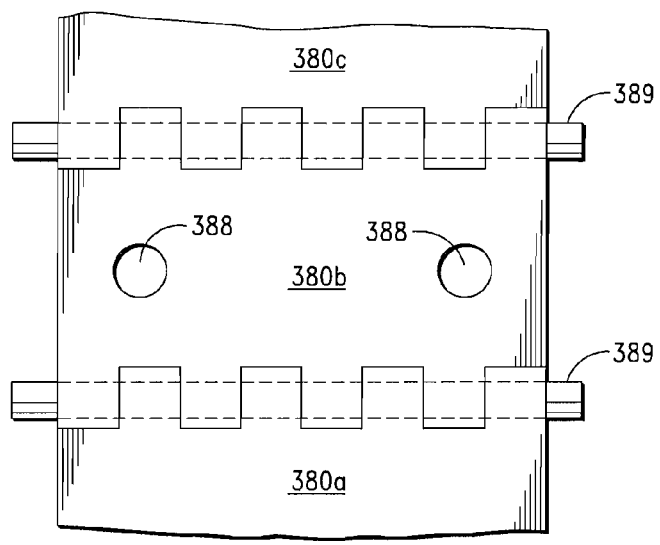
FIG. 8B is a top view of a portion of the conveyors shown in FIG. 8A illustrating the adjacent plate sections held together by shafts. For clarity, the ball bearings, which are also secured to the shaft, are not shown.
Figure 8C:
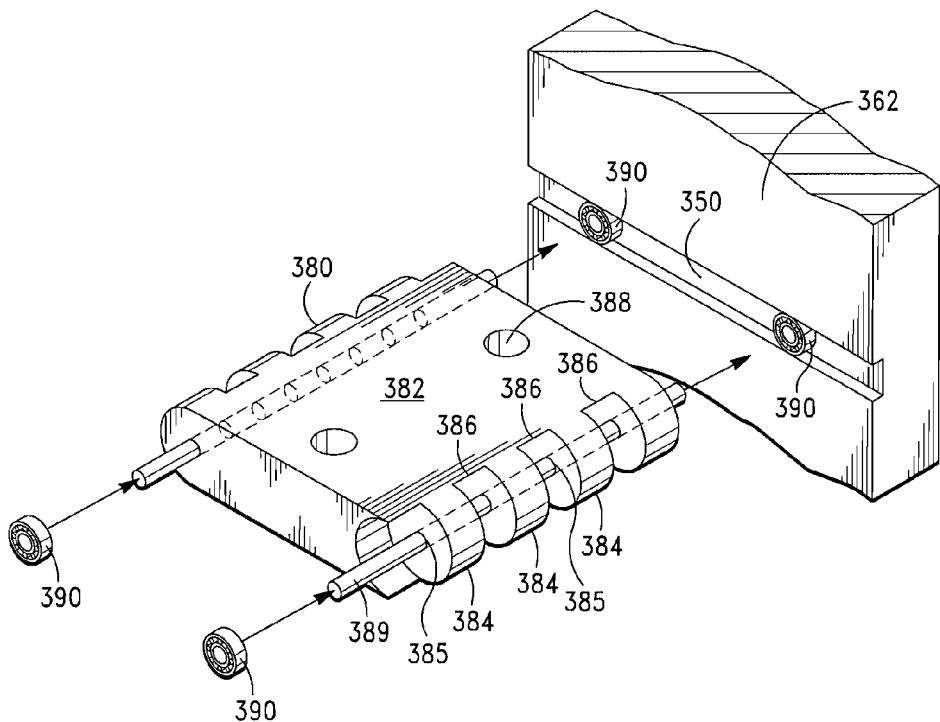
FIG. 8C is an exploded view of a plate section shown in FIG. 8A illustrating how the shaft and ball bearings are used to secure adjacent plate sections together, and, how the ball bearings are aligned within a groove in the frame.
Figure 8D:
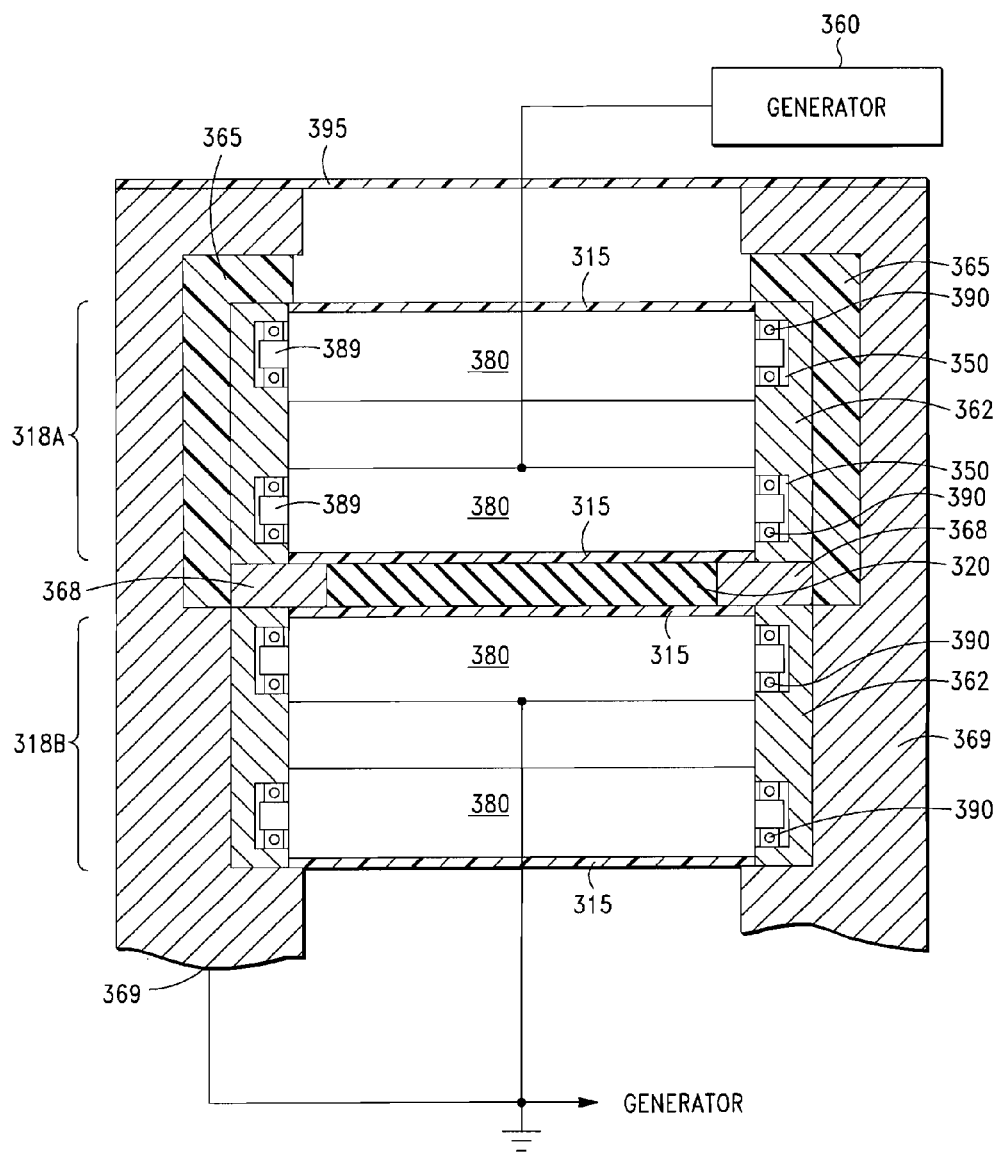
FIG. 8D is a cross-section of the devulcanization apparatus shown in FIG. 8A illustrating the groove within the frame through which the conveyor rotates.
Figure 8E:
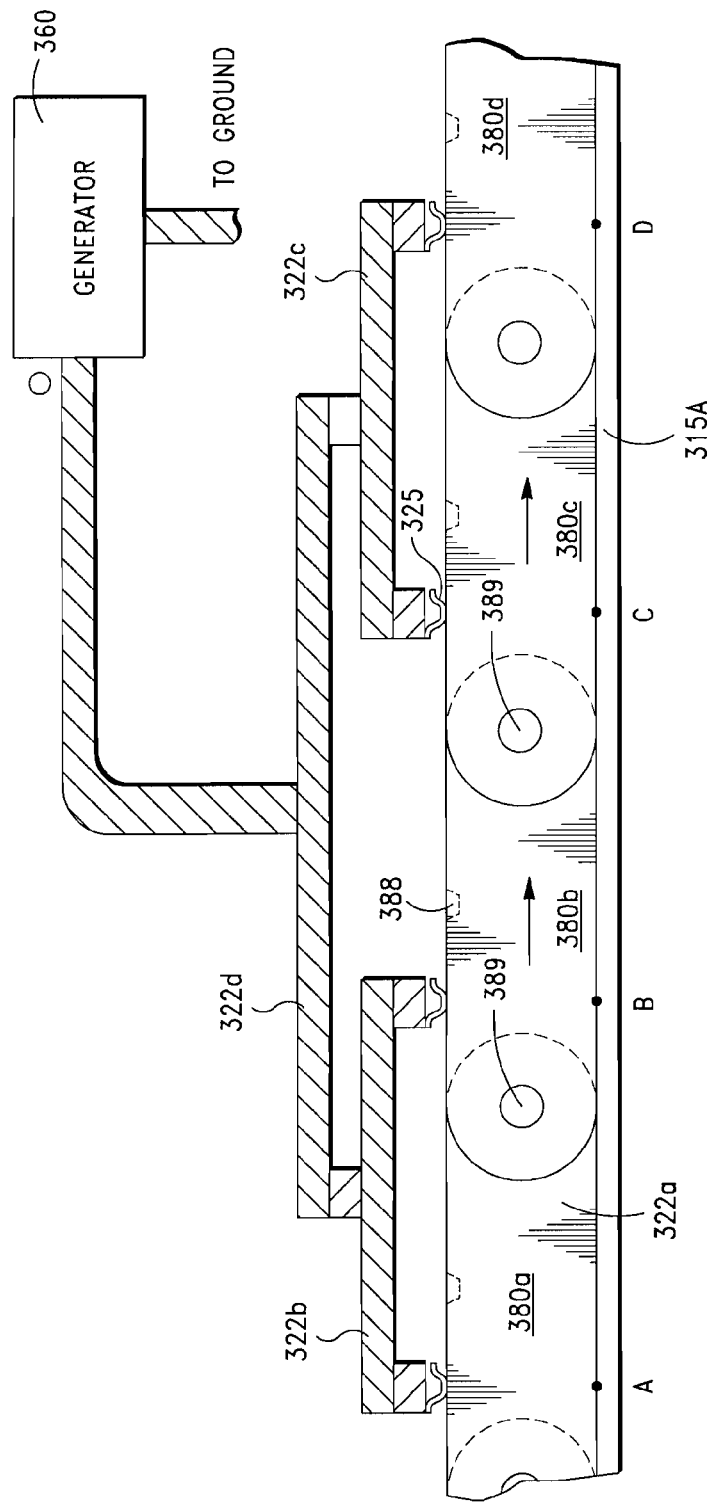
FIG. 8E illustrates an alternative electrode configuration for the devulcanization apparatus of FIG. 8A.

Referring to FIG. 8E, details of the exemplary electrode configuration shown in FIG. 8A are provided. In general, the devulcanizing apparatus 310 includes an electrode configuration similar to that shown in FIG. 4. With respect to the first conveyor 318A, it can be seen that top electrode comprises a main conveying plate 322a (comprised of the plate sections 380 as discussed above) electrically connected to plates 322b and 322c. The moving connection is maintained by a series of conductive flexible fingers 325 (which may be strips of metal, brushes, and the like) that extend from plates 322b, 322c to contact the moving plate 322a, as shown. Plates 322b and 322c are electrically connected to plate 322d, which is electrically connected to the power tube of the generator 360 (or other solid-state supply). The second conveyor 318B (see FIG. 8A) is electrically connected to ground. Thus, the first conveyor 318A functions as the high voltage electrode while the second conveyor 318B functions as the ground electrode. Typically, the voltage between the first conveyor 318A and the bottom second conveyor 318B is in the range of 1000 to 10,000 V, preferably in the range of 3000 to 7000 V, and more preferably in the range of 4000 to 6000 V. The alternating electric field is generated at frequencies ranging from about 1 to 100 MHz, is preferably generated at frequencies ranging from about 25 to 40 MHz, and is more preferably generated at either 27.12 MHz or 40.68 MHz.

As can be seen, in the illustrated embodiment, the vulcanized crosslinked elastomer particles are placed between the two conveyors 318A, 318B such that main conveying plate 322a of first conveyor 318A and the bottom conveyor 318B are positioned against the vulcanized crosslinked elastomer particles, thereby compressing them. Of course, the size of the conveyors 318A, 318B will vary depending on the surface area of the devulcanization region.

As shown in FIG. 8E, points A, B, C, and D are evenly spaced along the length of main conveying plate 322a, and the power tube of the generator is designated as point O. The size and positioning of the various plates are chosen such that the distances OA, OB, OC, and OD are the same and, thus, points A, B, C, and D are each located at the ¼ wavelength position (or, alternatively, ¼λ, plus a multiple of ½λ). For example, if the selected frequency is 27.12 MHz or 40.68 MHz, each of points A, B, C, and D would be located 9.1 feet or 6.15 feet, respectively, from point O.

Of course, one skilled in the art will understand that the devulcanization apparatus shown in FIG. 8A may utilize electrode configurations other than that shown in FIG. 8E. For example, main conveying plate 322a could comprise a single plate electrode in which case plates 322b, 322c and 322d would not be used (similar to the electrode configuration generally depicted and described in connection with FIG. 2). In this case, a single point would be located at the ¼ wavelength position (or, alternatively, ¼λ plus a multiple of ½λ). Also, a plurality of electrically connected plates could be arranged in a tiered configuration in which case additional plates (i.e., plates in addition to plates 322b, 322c and 322d) would be used (similar to the electrode configuration generally depicted and described in connection with FIG. 4). In this case, eight points or more would be located at the ¼ wavelength position (or, alternatively, ¼ plus a multiple of ½λ). It should be understood that all of these alternative electrode configurations are within the scope of the present invention.

The present invention is also directed to a process for revulcanizing the devulcanized elastomers formed using the alternating electric field as discussed herein. That is, as generally shown in FIG. 1, the devulcanized elastomers formed by application of the alternating electric field may be revulcanized in order to provide new useful articles. The devulcanized elastomers formed using the alternating electric field may also be combined with other polymer stocks (such as virgin or fresh unvulcanized rubber) and then revulcanized or otherwise crosslinked.

In an exemplary embodiment, the rubber devulcanized in accordance with the present invention is revulcanized—either alone or by combining the devulcanized rubber with virgin or fresh unvulcanized rubber and then subjecting it to a vulcanization process. The devulcanized rubber formed by application of the alternating electric field may be present in the composition to be revulcanized at any suitable level—for example, about 10, 20 30, 40, 50, 60, 70, 80, 90, or 100 wt %. Preferably, the devulcanized rubber comprises at least 10 wt % of the end product. For certain articles such as belts, hoses, or shoe treads, it may be possible to use 100% devulcanized rubber during the revulcanization process.

The devulcanized rubber of the present invention may be used to form a variety of tire tread and tire tread cap rubber compositions such as those taught in Bauer et al., U.S. Pat. No. 5,378,754, and Burlett et al., U.S. Pat. No. 5,023,301. For instance, the devulcanized rubber may be blended with a rubber selected from the group consisting of cis-1,4-polyisoprene (natural or synthetic), cis-1,4-polybutadiene, 3,4-polyisoprene, styrene/butadiene copolymers, styrene/isoprene/butadiene terpolymers, butadiene/acrylonitrile copolymers, isoprene/acrylonitrile copolymers, nitrile/butadiene copolymers and mixtures thereof.

The devulcanized rubber of the present invention may also be combined with a suitable filler. Examples of fillers include, but are not limited to, silica, alumina, diatomaceous earths, titanium dioxide, iron oxide, zinc oxide, magnesium oxide, metal ferrite, and other such oxides; aluminum hydroxide, magnesium hydroxide, and other such hydroxides; calcium carbonate (light and heavy), magnesium carbonate, dolomite, dawsonite, and other such carbonates; calcium sulfate, barium sulfate, ammonium sulfate, calcium sulfite, and other such sulfates and sulfites; talc, mica, clay, glass fiber, calcium silicate, montmorillonite, bentonite, and other such silicates; zinc borate, barium metaborate, aluminum borate, calcium borate, sodium borate, and other such borates; carbon black, graphite, carbon fiber, and other such forms of carbon; as well as powdered iron, powdered copper, powdered aluminum, zinc flowers, molybdenum sulfate, boron fiber, potassium titanate, and lead titanate zirconate.

Synthetic resins can be utilized as the organic fillers. Examples include powders of alkyd resins, epoxy resins, silicone resins, phenolic resins, polyester, acrylic resins, acetal resins, polyethylene, polyether, polycarbonate, polyamide, polysulfone, polystyrene, polyvinyl chloride, fluoro resins, polypropylene, ethylene-vinyl acetate copolymers, and various other such thermosetting resins or powder of thermoplastic resins, or powders of copolymers of these resins. Further, other examples of organic fillers which can be utilized include aromatic or aliphatic polyamide fibers, polypropylene fibers, polyester fibers, and aramid fibers.

Antioxidants, UV light stabilizers, and processing oils can be included as well. Antioxidants include physical protectorants and chemicals which minimize oxidation. The chemicals include amines, phenolics, and phosphites. Processing oils are usually chosen based on compatibility with the rubber and desirable color and/or aging properties. They may be organic ester plasticizers, mineral oils, vegetable oils, paraffinic oils, naphthenic oils, or other aromatic oils. The rubber composition may also include lubricants, antistatic agents, pigments, dyes, flame retardants, or processing aids, which are all well known to those skilled in the art.

The methods used to re-vulcanize the elastomer material that was previously devulcanized by application of the alternating electric field include any of those known in the art. In general, the vulcanization system is one suitable for reacting with and crosslinking the elastomer material. Depending on the elastomer, suitable crosslinking or curing agents include sulfur, sulfur donors, peroxides, metallic oxides, diamines, bismaleimides, and the like. Powdered sulfur, sulfur flowers, sulfur chloride, deoxygenated sulfur, sediment sulfur, colloidal sulfur, surface-treated sulfur, and the like can be used as the sulfur. Peroxides which may be utilized include, for example, di-t-butyl peroxide, t-butylcumyl peroxide, dicumyl peroxide, and other such dialkyl peroxides, acetyl peroxide, lauroyl peroxide, benzoyl peroxide, and other such diacyl peroxides, methyl ethyl ketone peroxide, cyclohexanone peroxide, 3,3,5-trimethyl cyclohexanone peroxide, methyl cyclohexanone peroxide, and other such ketone peroxides, 1,1-bis(t-butyl peroxy)cyclohexane, and other such peroxyketals, t-butyl hydroperoxide, cumene hydroperoxide, 1,1,3,3-tetramethyl butyl hydroperoxide, p-menthane hydroperoxide, diisopropylbenzene hydroperoxide, 2,5-dimethylhexane-2,5-dihydroperoxide, and other such hydroperoxides, t-butyl peroxyacetate, t-butylperoxy-2-ethyl hexanoate, t-butyl peroxybenzoate, t-butyl peroxyisopropyl carbonate, and other such peroxy esters. Examples of maleimide crosslinking agents are m-phenylene bismaleimide (4,4'-m-phenylene bismaleimide), 4,4'-vinylenediphenyl bismaleimide, p-phenylene bismaleimide, 4,4'-sulfonyldiphenyl bismaleimide, 2,2'-dithiodiphenyl bismaleimide, 4,4'-ethylene-bis-oxophenyl bismaleimide, 3,3'-dichloro-4,4'-biphenyl bismaleimide, hexamethylene bismaleimide, and 3,6-durine bismaleimide. Zinc oxide may be used alone or in combination with other crosslinking agents for halogenated rubbers such as bromobutyl rubbers. Resin crosslinking agents can be used. The resins include methylol phenolic resins, brominated phenolic resins, urethane resins etc. The most preferred crosslinking agent is sulfur. It is preferably used in an amount of about 0.1 to about 3.0 parts by weight per 100 parts by weight of the rubber polymer. The preferred amount of sulfur is about 1.0 to 2.0 wt %.

Various vulcanization accelerators, promoters, and/or initiators can be added to the vulcanization mixture. Typical vulcanization accelerators include, but are not necessarily limited to: guanidine type vulcanization accelerators, aldehyde-ammonia type vulcanization accelerators, sulphenamide type vulcanization accelerators, thiuram type vulcanization accelerators, xanthate type vulcanization accelerators, aldehyde-amine type vulcanization accelerators, thiazole type vulcanization accelerators, thiourea type vulcanization accelerators, dithiocarbamate type vulcanization accelerators, and mixed types of these. Examples of vulcanization accelerators include, for example, tetramethylthiuram disulfide ("TMTD"), tetramethylthiuram monosulfide ("TMTM"), N-oxydiethylene-2-benzothiazolyl sulfenamide ("OBS"), N-cyclohexyl-2-benzothiazyl sulfenamide ("CBS"), N-t-butyl-2-benzothiazyl sulfenamide ("TBBS"), benzothiazyl-2-sulphene morpholide ("MBS"), N-dicyclohexyl-2-benzothiazyl sulfenamide ("DCBS"), tetramethylthiuram disulfide ("TMTD"); diphenylguanidine ("DPG"), mercaptobenzothiazole (MBT), mercaptobenzothiazole disulfide ("MBTS"), the zinc salt of mercaptobenzothiazole ("ZMBT"), tetramethylthiuram hexasulfide, N,N-diphenylurea, morpholinethiobenzothiazole, zinc di-n-butyl dithiocarbamate, zinc dimethyl dithiocarbamate, and zinc flowers. Examples of guanidine type vulcanization accelerators include diphenyl guanidine, triphenyl guanidine, di-orthotolyl guanidine, ortho-tolyl biguanide, and diphenyl guanidine phthalate. Examples of aldehyde-ammonia vulcanization accelerators include hexamethylene diamine and acetaldehyde-ammonia. Examples of thiuram vulcanization accelerators include tetramethylthiuram monosulfide, tetramethylthiuram disulfide, tetraethylthiuram disulfide, tetrabutylthiuram disulfide, and dipentamethylenethiuram tetrasulfide. Examples of aldehyde-amine vulcanization accelerators include the reaction product of butyraldehyde and aniline and aldehyde-ammonia compounds such as hexamethylene diamine and acetaldehyde-ammonia. Examples of xanthate type vulcanization accelerators include, but are not necessarily limited to: sodium isopropylxanthate, zinc isopropylxanthate, zinc ethylxanthate, zinc butylxanthate, and dibutylxanthate disulfide. Examples of thiazole type vulcanization accelerators include N cyclohexyl-2-benzothiazole sulfenamiden, N-oxydiethylene-2-benzothiazolesulfenamide, N,N-diisopropyl-2-benzothiazole sulfenamide, 2-mercaptobenzothiazole, 2-(2,4-dinitrophenyl)mercaptobenzothiazole, 2-(2,6-diethyl-4-morpholinothio)benzothiazole, and benzothiazyldisulfide. Examples of thiourea vulcanization accelerators include thiocarbanilide, diethylthiourea, dibutylthiourea, trimethylthiourea, and di-ortho-tolyl thiourea. Examples of dithiocarbamate type vulcanization accelerators include, but are necessarily limited to: sodium dimethyldithiocarbamate, sodium diethyldithiocarbamate, sodium di-n-butyldithiocarbamate, zinc ethylphenyldithiocarbamate, zinc dimethyldithiocarbamate, zinc diethyldithiocarbamate, zinc di-n-butyldithiocarbamate, zinc dibenzylthiocarbamate, zinc N-penta-methylenedithiocarbamate, zinc dimethylpentamethylenedithio-carbamate, zinc ethylphenyldithiocarbamate, selenium dimethyldithiocarbamate, selenium diethyldithiocarbamate, tellurium diethyldithiocarbamate, cadmium diethyldithiocarbamate, dimethylammonium dimethyldithiocarbamate, dibutylammonium dibutyldithiocarbamate, diethylamine diethyldithiocarbamate, N,N'-dimethylcyclohexane salt of dibutyldithiocarbamic acid, pipecolic methylpentamethylenedithiocarbamate, and the like.

Depending on the particular vulcanization accelerator employed, preferred amounts of accelerator typically range from about 0.1 to about 3.0 parts by weight per 100 parts by weight of the rubber polymer. For example, an accelerator system comprising about 0.5 to 2 wt % MBTS and 0.1 to 0.3 wt % TMTD may be employed for devulcanized crumb rubbers from most tires during the revulcanization process Vulcanization times may differ depending on the crosslinking agent, the vulcanization accelerator, and the vulcanization temperature.

A coupling agent may also be used in the present invention. There are no specific limitations on the coupling agent, and selections suited to objectives can be made. However, a typical silane coupling agent like Si69. Examples of other silane coupling agents may include bis(3-triethoxysilylpropyl)tetrasulfide, bis(2-1-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 3-nitropropyltrimethoxysilane, 3-nitropropyltriethoxysilane, 3-chloropropyltrimethoxysilane, 3-chloropropyltriethoxysilane, 2-chloroethyltrimethoxysilane, 2-chloroethyltriethoxysilane, 3-trimethoxysilylpropyl-N,N'-dimethylthiocarbamoyltetrasulfide, 3-triethoxysilylpropyl-N,N'-dimethylthiocarbamoyltetrasulfide, 2-triethoxysilylethyl-N,N-dimethylthiocarbamoyltetrasulfide, 3-trimethoxysilylpropylbenzothiazoletetrasulfide, 3-triethoxysilylpropylbenzothiazoletetrasulfide, 3-triethoxysilylpropylmethacrylatemono sulfide, and 3-trimthoxysilylpropylmethacrylayemono sulfide.

In a preferred aspect, the elastomers that have been devulcanized by application of the alternating electric field are revulcanized using one of two preferred methods. The first involves heating the devulcanized elastomers (preferably with virgin or fresh unvulcanized rubber) to a suitable temperature for a suitable time. Typically, heating in an oven at 150 to 180° C. for 5 to 25 minutes will result in sufficient revulcanization. Second, the elastomers may be heated in a radio frequency mold, such as the one described in Marc, U.S. Published Patent Application No. 2009/236030. The exposure time to the alternating electric field varies depending upon the voltage applied, but typically ranges between several seconds to up to two minutes. Thus, the exposure time is generally longer than that utilized to devulcanize the elastomer. For example, application of 8000 V for 10 to 50 seconds at 27.12 MHz is typically sufficient to vulcanize a rubber composition about 0.1 to 1.0 inch thick having a sulfur crosslinking agent added thereto.

It will be appreciated that while Marc, U.S. Published Patent Application No. 2009/0236030 describes a process for vulcanizing rubber using an alternating electric field, the present invention described herein is one in which vulcanized rubber is devulcanized using an alternating electric field. Vulcanization typically requires much higher temperatures (on the order of 150 to 220° C., and typically about 160 to 190° C.) and the addition of a crosslinking agent—although theoretically some crosslinking may occur by virtue of residual sulfur in the devulcanized rubber.

The examples below are intended to illustrate the present invention. The descriptions in no way limit the scope of the present invention. In the examples, the properties of the combination of vulcanized rubber samples are evaluated as follows:

Coefficient of friction: Measured using an aluminum sheet.
Abrasion Weight Loss: Loss of weight after 4000 revolutions on a diamond wheel abrader.
Tensile Strength: Measurements were carried out in accordance with ASTM Standard D412, test method A.

Elongation at Break: Measured as a percentage value according to ASTM standard D412, test method A.

Shore Hardness: Measurements carried out in accordance with ASTM Standard D2240.

Modulus 300%: Measurements were carried out in accordance with ASTM Standard D412, test method A.

EXAMPLE 1

Truck and Car Tire Rubber

In this example, the physical parameters of vulcanized tire rubber derived from unground tires are shown in column 1 of Table 1. For comparison, vulcanized ground tire rubber ("VGTR") obtained from a mixture of truck and car tires from Quest Recycling Services (Concordia, Kans.) was devulcanized by applying an alternating electric field having a voltage of about 4000 to 6000 V at a frequency of 27.12 MHz for about 30 to 50 seconds. The VGTR likely comprised a mixture of nitrile-butadiene rubber and styrene-butadiene rubber in unknown ratios having a 30 mesh particle size. The VGTR was placed in a mold that measures 8×12 inches and was about ¼-inch thick and generally configured as shown in FIG. 2.

Following devulcanization, the devulcanized ground tire rubber ("DGTR") was combined with varying amounts of virgin or fresh unvulcanized rubber ("FR") and then vulcanized. The FR comprised a mixture of isoprene, styrene butadiene, polybutadiene, filler, zinc oxide, stearic acid, oil, sulfur, and accelerator. About 2.5 wt % (based on the weight of the rubber) of sulfur, 1.75% MBTS, and 0.3% TMTD was added to the varying DGTR/FR compositions and then the composition was heated in an oven. During vulcanization, the temperature of the rubber composition reached temperature of about 160 to 190° C. The properties of the revulcanized compositions from the VGTR that has been devulcanized to form DGTR using the alternating electric field are shown in columns 2-7 of Table 1.

seconds. The VGSSR was placed in a mold that measures 8×12 inches and was about ⅛-inch thick and generally configured as shown in FIG. 2.

Following devulcanization, the DGSSR was combined with varying amounts of FSSR and then vulcanized. More specifically, about 1.1 wt % (based on the weight of the rubber) of sulfur, 0.8% MBTS, and 0.12% TMTD was added to the varying DGSSR/FSSR compositions and then the composition was heated in an oven. During vulcanization, the temperature of the rubber composition reached a temperature of about 160° C. over a period of six minutes. The properties of the revulcanized compositions from the VGSSR that has been devulcanized to form DGSSR using the alternating electric field are shown in Table 2.

TABLE 2

Physical Properties of VGSSR and Revulcanized DGSSR/FSSR

| Properties | 100% FSSR | 50% DGSSR 50% FSSR | 70% DGSSR 30% FSSR | 100% DGSSR |
|---|---|---|---|---|
| Coefficient of Friction | 0.800 | 0.867 | 0.800 | 0.734 |
| Abrasion Weight loss (g) | 0.23 | 0.21 | 0.19 | 0.17 |
| Tensile Strength (kg/cm$^2$) | 159 | 130 | 95 | 61 |
| Elongation at break (%) | 790 | 575 | 500 | 325 |
| Hardness Shore A | 63 | 66 | 67 | 65 |
| Modulus 300% (kg/cm$^2$) | 51 | 47 | 38 | NA |

EXAMPLE 3

Passenger Car Tire Rubber

In this example, the physical parameters of vulcanized passenger car tire rubber derived from composition comprising virgin or fresh rubber ("FR") and devulcanized ground passenger car tire rubber ("DGCTR") are shown in Table 3. The vulcanized ground passenger car tire rubber ("VGCTR") from Lehigh Technologies (Tucker, Ga.) had a particle size of

TABLE 1

Physical Properties of VGTR and Revulcanized DGTR/FR

| Properties | Vulcanized Tire Rubber (before being ground) | 100% FR | 60% DGTR 40% FR | 70% DGTR 30% FR | 80% DGTR 20% FR | 90% DGTR 10% FR | 100% DGTR |
|---|---|---|---|---|---|---|---|
| Coefficient of Friction | 0.69 | 0.75 | 0.84 | 0.86 | 0.87 | 0.89 | 0.91 |
| Abrasion Weight loss (g) | 0.31 | 0.02 | 0.23 | 0.24 | 0.25 | 0.31 | 0.34 |
| Tensile Strength (kg/cm$^2$) | Y 94 Z | 0.06Y 113 1.2Z | 0.74Y 88 0.94Z | 0.77Y 88 0.94Z | 0.80Y 81 0.86Z | Y 55 0.58Z | 1.1Y 58 0.62Z |
| Elongation at break (%) | 375 | 450 | 330 | 325 | 300 | 250 | 185 |
| Hardness Shore A | 68 | 69 | 70 | 71 | 74 | 76 | 81 |

EXAMPLE 2

Shoe Rubber

In this example, the physical parameters of vulcanized shoe sole rubber derived from composition comprising virgin or fresh shoe sole rubber ("FSSR") and scrap devulcanized ground shoe sole rubber ("DGSSR") are shown in Table 2. Vulcanized ground shoe sole rubber ("VGSSR") was ground into small particles (40 mesh) and devulcanized by applying an alternating electric field having a voltage of about 4000 to 6000 V at a frequency of 27.12 MHz for about 30 to 50

40 mesh, and was devulcanized by applying an alternating electric field having a voltage of about 4000 to 6000 V at a frequency of 27.12 MHz for about 30 to 50 seconds. The VGCTR was placed in a mold that measures 8×12 inches and was about ¼-inch thick and generally configured as shown in FIG. 2.

Following devulcanization, the devulcanized ground tire rubber ("DGCTR") was combined with varying amounts of virgin or fresh unvulcanized rubber ("FR") and then vulcanized. The FR comprised a mixture of isoprene, styrene butadiene, polybutadiene, filler, zinc oxide, stearic acid, oil, sulfur, and accelerator. More specifically, about 2.5 wt % (based on the weight of the rubber) of sulfur, 1.75% MBTS, and 0.3% TMTD was added to the varying DGCTR/FR compositions and then the composition was heated in an oven. During vulcanization, the temperature of the rubber composition reached a temperature of about 160 to 190° C. The properties the revulcanized compositions from the VGCTR that has been devulcanized to form DGCTR using the alternating electric field are shown in Table 3.

TABLE 3

Physical Properties of Revulcanized DGCTR/FR

| Properties | 100% FR | 70% DGCTR (Mesh 40) 30% FR | 70% DGCTR (Mesh 105) 30% FR |
|---|---|---|---|
| Coefficient of Friction | .75 | .734 | 1.16 |
| Abrasion Weight Loss (g) | .02 | NA | .07 |
| Tensile (kg/cm$^2$) | 113 | 129.5 | 125 |
| Elongation at Break (%) | 450% | 350% | 440% |
| Hardness Shore A | 69 | 73 | 72 |

From the foregoing it will be seen that this invention is one well adapted to attain all ends and objectives herein-above set forth, together with the other advantages which are obvious and which are inherent to the invention. Since many possible embodiments may be made of the invention without departing from the scope thereof, it is to be understood that all matters herein set forth or shown in the accompanying drawings are to be interpreted as illustrative, and not in a limiting sense. While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A devulcanization apparatus for devulcanizing a plurality of cross-linked elastomer particles, comprising:
   a first conveyor functioning as a high voltage electrode, wherein the first conveyor comprises a first main conveying plate having a plurality of plate sections comprised of a first electrically conductive material which are interconnected together;
   a second conveyor functioning as a ground electrode, wherein the second conveyor comprises a second main conveying plate having a plurality of plate sections comprised of a second electrically conductive material which are interconnected together;
   a generator operable to apply an alternating electric field between said first and second conveyors; and
   a devulcanization region between said first and second conveyors in which said cross-linked elastomer particles are placed.

2. The apparatus of claim 1 wherein the voltage applied to said first conveyor is between 1000 V and 10,000 V.

3. The apparatus of claim 1 wherein said plate sections of said first and second main conveying plates are sized and shaped to permit the first and second main conveying plates to be conveyed in a loop while maintaining the cross-linked elastomer particles under pressure.

4. The apparatus of claim 1 wherein each of said plate sections comprises a main body section having a plurality of protrusions and recesses such that the protrusions of a first plate section engage corresponding recesses in an adjacent second plate section and wherein a shaft extends through said first and said second plate sections to secure the first and second plate sections together.

5. The apparatus of claim 1 wherein each of the plate sections has one or more holes for engaging teeth of a driver for driving the first and second conveyors.

6. The apparatus of claim 4 wherein said shaft extends through a plurality of ball bearings, said ball bearings being retained in a groove formed in a conveyor frame as the first conveyor moves.

7. The apparatus of claim 6 wherein said conveyor frame includes an insulator adjacent to said first conveyor.

8. The apparatus of claim 1 wherein said first and second conveyors are capable of compressing vulcanized elastomer particles in said devulcanization region to about 50 to 5000 psi.

9. The apparatus of claim 1 wherein said generator is operable to generate a signal that is substantially a sinusoid having a wavelength λ, and wherein said plurality of cross-linked elastomer particles are positioned between said first and second conveyors and adjacent a point on said first conveyor that is located a distance of ¼λ or ¼λ plus a multiple of ½λ from said generator such that a substantially constant voltage is provided between said first and second conveyors.

10. The apparatus of claim 1 wherein a substantially constant current passes between said first and second conveyors.

* * * * *